United States Patent [19]

Blevins et al.

[11] 4,331,865

[45] May 25, 1982

[54] DENT COUNTER FOR LOOM REED

[75] Inventors: Maurice E. Blevins, Spartanburg, S.C.; Gilbert E. Carlson, Asheville, N.C.

[73] Assignee: Steel Heddle Manufacturing Company, Greenville, S.C.

[21] Appl. No.: 82,800

[22] Filed: Oct. 9, 1979

[51] Int. Cl.³ .............................................. G01V 9/04

[52] U.S. Cl. ............................ 250/222 PC; 235/92 V

[58] Field of Search ....... 235/92 V; 250/227, 222 PC, 250/222 R

[56] References Cited

U.S. PATENT DOCUMENTS

| | | | |
|---|---|---|---|
| 3,692,985 | 9/1972 | Kalman | 235/92 V |
| 3,935,997 | 2/1976 | Loje | 235/92 V |
| 4,029,391 | 6/1977 | French | 250/227 |
| 4,097,725 | 6/1978 | Lieberman et al. | 250/222 R |
| 4,151,402 | 4/1979 | Fernandez et al. | 250/222 R |

*Primary Examiner*—David C. Nelms
*Attorney, Agent, or Firm*—Dority & Flint

[57] ABSTRACT

A counter for counting the dents of a loom reed including a housing having a relatively smooth bottom surface for allowing the housing to be manually slid over the dent of a reed for counting the dents. A light beam is directed by means of a fiber optic member onto the dent and is reflected back through a fiber optic bundle carried coaxially of the first fiber optic member to trigger a transistor responsive to each reflected signal. Operational amplifiers produce pulses responsive to the triggering of the transistor which are counted by a counter and displayed by a light display member.

1 Claim, 2 Drawing Figures

DENT COUNTER FOR LOOM REED

BACKGROUND OF THE INVENTION

The invention relates to a counter and, more particularly, to a counter which utilizes light beams for counting the dents of a loom reed.

Heretofore, loom reeds have been manually counted which is a slow and tedious job. In order to speed up the process, counters utilizing light beams positioned on one side of the reed and a detector positioned on the other side of the reed were developed. These counters were stationary requiring the reeds to be brought to the site of the counter.

Furthermore, if the reeds were not perfectly aligned, improper counting operations took place.

SUMMARY OF THE INVENTION

The present invention relates to a counter for counting the dents of a reed which includes a housing having a relatively smooth bottom surface which allows the housing to be manually slid over the dents of the reed when counting the reeds. The device is portable and includes a light source which is carried within the housing. A photo transistor is also carried in the housing. A fiber optic member extends from adjacent the light source down to the bottom of the smooth surface for directing a beam of light towards the dents being counted. Coaxially of the fiber optic member is another fiber optic bundle which receives reflected light signals from the dents and transmits these reflected light signals back to the photo transistor.

The photo transistor is triggered responsive to each reflected signal and a pair of operational amplifiers generate pulses responsive to the triggering of the photo transistor. These pulses are, in turn, fed to a digital counter which counts the pulses and displays the number of counted pulses on a visual read-out display panel.

Accordingly, it is an important object of the present invention to provide a relatively simple and reliable apparatus for counting the number of dents in a reed.

Another important object of the present invention is to provide a portable counter which accurately counts the dents of loom reeds.

These objects and other objects, features, aspects and advantages of the present invention will become more apparent upon reading the following specification and claims.

DESCRIPTION OF A PREFERRED EMBODIMENT

Figure 1:
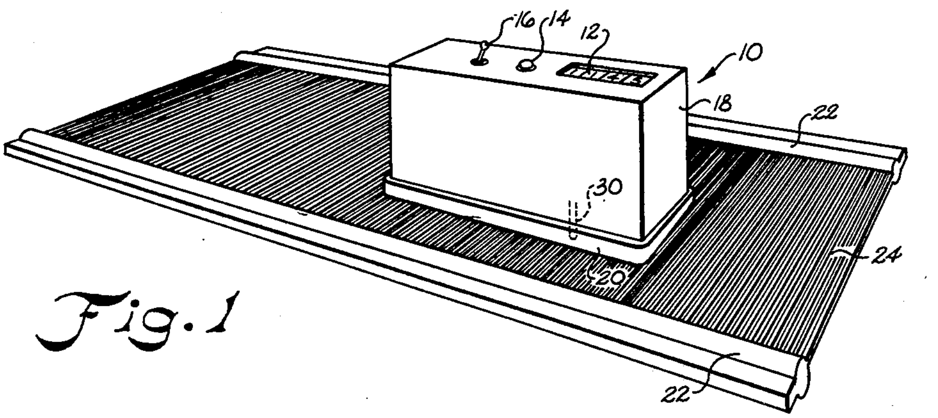
FIG. 1 is a perspective view illustrating a counter constructed in accordance with the present invention being utilized for counting the dents of a loom reed.

Referring in more detail to FIG. 1 of the drawing, there is illustrated by the reference character 10, a housing which incorporates the counter. The housing 10 can be constructed of any suitable material and, in one particular embodiment, is a metallic housing. It has a four digit seven segment LED display carried on the top thereof as indicated by the reference character 12. Also associated with the counter is a reset button 14 and an on-off switch 16. The metallic housing 18 is positioned on top of a nonabrasive block 20 such as a wooden block so that the dents are not scratched as the counter 10 is moved over the reed. The reed consists of a pair of opposed frame members 22 which support the dents 24 extending therebetween.

The dents 24 are thin, metallic strips and the counter illustrated is capable of counting up to 72 dents per inch.

Figure 2:
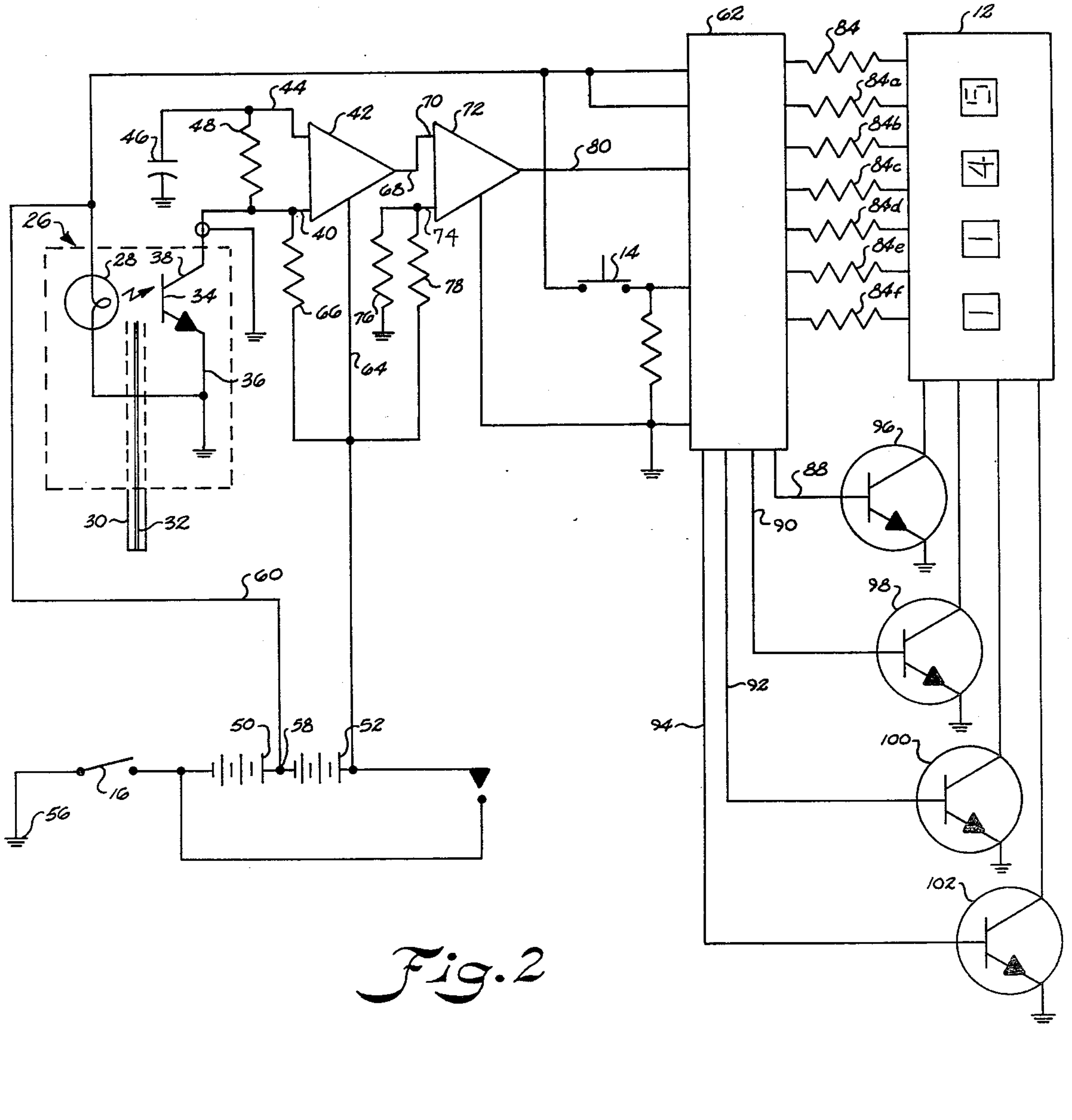
FIG. 2 is an electrical schematic diagram for the counter of FIG. 1.

Referring now to FIG. 2 of the drawing, there is illustrated a conventional fiber optic light probe generally designated by the reference character 26 which has a light source 28 provided therein. This light source is directed through a probe which extends through the wooden block 20 and terminates adjacent the bottom surface thereof. The light strikes the dents as the counter moves across the reed and each dent reflects a signal back up to a fiber optic member 32 which is carried within the center of the light probe. This light signal is fed through the fiber optic member 32 to a transistor 34 that is triggered responsive to receiving the light signal.

The emitter electrode of the transistor 34 is connected to ground through lead 36. It is to be understood that the transistor 34 is a photo transistor for sensing light signals and converting the light signals into electrical signals.

Appearing on the collector electrode 38 of the photo transistor is a pulse that is, in turn, connected to one input 40 of an operational amplifier 42. The other input 44 of the operational amplifier 42 is connected to ground through a capacitor 46.

A resistor 48 is connected between the inputs 40 and 44 of the operational amplifier for setting or adjusting the operational amplifier to be compatible with the characteristics of the transistor 34.

Power is supplied to the circuit from a pair of DC batteries 50 and 52 that are connected in series. An on-off switch 54 is connected between the batteries 50 and 52 and ground 56. A charging jack is also connected across the batteries 50 and 52 so that they can be recharged.

At a junction 58 between the two batteries 50 and 52, there is a lead 60 that is connected to one side of the light source for illuminating the lamp 28. It is also connected to a CMOS integrated counter 62. The operational amplifier is powered by both of the batteries 50 and 52 through lead 64. A resistor 66 is connected between input 40 of the operational amplifier 42 and the lead 64.

The output 68 of operational amplifier 42 is connected to one input 70 of another operational amplifier 72. The other input 74 of operational amplifier 72 is connected to ground through a resistor 76. It is also connected through a resistor 78 back to the power source through lead 64.

The resistors 76 and 78 act as a voltage divider for holding the input 74 of the operational amplifier at the half level.

The output of operational amplifier 72 is connected by lead 80 to an input of the integrated counter 62. Also connected to the integrated counter 62 is a reset button 14 which resets the counter upon being depressed. It is to be understood that the integrated CMOS counter 62 is a conventional counter and any suitable conventional counter could be utilized in its place.

The output of the CMOS counter is connected by means of parallel leads 84*a* through 84*f*, each of which contains a resistor to a display seven-segment LED display 12.

Also extending from the integrated counter 62 are four leads 88, 90, 92, and 94, each of which is connected to the base electrode of a respective transistor 96, 98, 100, and 102. The lead 88 is connected to trigger transistor 96 responsive to the most significant bit whereas lead 94 is provided for triggering transistor 102 responsive to the lease significant bit of information appearing in the counter 92. The collector electrodes of the transistor 96, 98, 100, and 102 are connected to a respective digit cathode shown in the display 12 for controlling the activation of that particular digit. According to the information supplied by the binary coded decimal counter 62, the respective transistor 96 through 102 are turned on for activating the particular display characters of the display counter 86.

In summarizing the operation of the counter, an operator first positions the counter down on top of the reeds adjacent one end with the light probe 30 not yet engaging the first reed. He then moves the counter to the left or right depending on what side of the reed he started on and as the light probe passes over each of the dents in the reed, a signal is reflected back that is counted by the counter. The counter displays the total number of dents carried on the reed on the display 12.

As the probe 30 passes over each dent, the light that is directed downwardly through the light probe 30 is reflected back up through the fiber optic member 32 for triggering the photo transistor 34. When the photo transistor 34 is triggered, a pulse is supplied to the input 40 of the operational amplifier 42. This input pulse in turn causes a high signal to appear on the output terminal 68. This high signal is in turn fed to input 70 of operational amplifier 72.

Operational amplifier 72 inverts the high signal and also shapes the signal to make certain that it is a saturated signal. The inverted and saturated signal then appears on output terminal 80 and is fed into the integrated counter 62.

The counter 62 counts the signals which are applied thereto in sequence to register the total number of dents carried on the reed. This signal is then converted by the BCD counter 62 and is fed to the LED character display 12 for physically displaying the total number of dents provided in the reed.

The display 86 can be reset when desired by depressing the reset button 14.

While a preferred embodiment of the invention has been described using specific terms, such description is for illustrative purposes only, and it is to be understood that changes and variations may be made without departing from the spirit or scope of the following claims.

What is claimed is:

1. An apparatus for counting the dents of a loom reed comprising:

a housing having a relatively smooth surface allowing said housing to be manually slid over said dents to be counted;

a source of light directed towards said dents;

a photo transistor carried in said housing;

a fiber optic member extending through said smooth surface and terminating adjacent said photo transistor for triggering said transistor responsive to each reflected signal produced by said light striking each dent as said housing is slid over said dents;

means connected to said transistor producing a pulse each time said transistor is triggered;

a pair of operational amplifier means connected to the said transistor for receiving said pulses and inverting, amplifying and shaping said pulses and producing saturated signals responsive to each pulse;

counter means for counting said saturated signals;

means connected to said counter means for visually displaying the count registered by said counter thereby indicating the total number of dents counted; and a second fiber optic member concentrically carried on said fiber optic member extending through said smooth surface for guiding said light from said light source to said dents.

* * * * *